(12) United States Patent
Saito et al.

(10) Patent No.: US 12,463,984 B2
(45) Date of Patent: Nov. 4, 2025

(54) IN-VEHICLE COMMUNICATION APPARATUS, VEHICLE, AND METHOD FOR RELAYING SIGNALS BETWEEN COMMUNICATION NETWORKS

(71) Applicant: HONDA MOTOR CO., LTD., Tokyo (JP)

(72) Inventors: Daisuke Saito, Tokyo (JP); Yuki Hirono, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 272 days.

(21) Appl. No.: 18/182,409

(22) Filed: Mar. 13, 2023

(65) Prior Publication Data
US 2023/0319061 A1 Oct. 5, 2023

(30) Foreign Application Priority Data
Mar. 31, 2022 (JP) .................. 2022-058882

(51) Int. Cl.
*H04L 9/40* (2022.01)
*B60R 16/023* (2006.01)
*H04L 12/40* (2006.01)

(52) U.S. Cl.
CPC ...... *H04L 63/1408* (2013.01); *B60R 16/0231* (2013.01); *H04L 12/40* (2013.01);
(Continued)

(58) Field of Classification Search
CPC . B60R 16/0231; H04L 63/1408; H04L 12/40; H04L 2012/40215; H04L 2012/40273
See application file for complete search history.

(56) References Cited

U.S. PATENT DOCUMENTS

| 8,955,130 | B1 * | 2/2015 | Kalintsev | G06F 21/567 |
| | | | | 710/100 |
| 2015/0271201 | A1 * | 9/2015 | Ruvio | H04L 67/12 |
| | | | | 726/23 |

(Continued)

FOREIGN PATENT DOCUMENTS

| JP | 2014146868 A | 8/2014 |
| JP | 2020032806 A | 3/2020 |

(Continued)

OTHER PUBLICATIONS

Office Action issued for counterpart Japanese Application No. 2022-058882, transmitted from the Japanese Patent Office on Jul. 15, 2025 (drafted on Jul. 9, 2025).

*Primary Examiner* — Mohamed A. Wasel

(57) ABSTRACT

An in-vehicle communication apparatus connected to a first communication network and a second communication network for relaying a signal to be transmitted and received between the first communication network and the second communication network includes a relay unit configured to relay a signal received from the first communication network to the second communication network, and an illegality determination unit configured to set processing of determining whether the signal to be relayed by the relay unit to the second communication network is an illegal signal to be lighter than processing of determining whether the signal received from the first communication network is an illegal signal.

16 Claims, 6 Drawing Sheets

(52) U.S. Cl.
 CPC ............... *H04L 2012/40215* (2013.01); *H04L 2012/40273* (2013.01)

(56) References Cited

U.S. PATENT DOCUMENTS

| | | | |
|---|---|---|---|
| 2015/0358351 A1 | 12/2015 | Otsuka | |
| 2017/0026386 A1* | 1/2017 | Unagami | H04L 12/40032 |
| 2018/0007076 A1* | 1/2018 | Galula | H04L 69/40 |
| 2018/0205703 A1* | 7/2018 | Grau | H04L 63/0209 |
| 2018/0314571 A1* | 11/2018 | Tanabe | H04L 63/1425 |
| 2019/0173912 A1* | 6/2019 | Ujiie | H04L 12/40 |
| 2019/0337526 A1* | 11/2019 | Rave | G06F 21/554 |
| 2020/0204395 A1* | 6/2020 | Takahashi | H04L 63/1425 |
| 2020/0205006 A1* | 6/2020 | Denis | H04L 63/1425 |
| 2021/0021498 A1 | 1/2021 | Sugashima | |
| 2021/0021618 A1* | 1/2021 | Tanaka | H04L 63/0236 |
| 2023/0208733 A1* | 6/2023 | Nakamura | H04L 67/12 370/252 |
| 2024/0169772 A1* | 5/2024 | Tanaka | G05B 19/042 |
| 2024/0199095 A1* | 6/2024 | Ohta | B61K 9/08 |
| 2025/0007935 A1* | 1/2025 | Koyama | H04L 63/1425 |

FOREIGN PATENT DOCUMENTS

| | | |
|---|---|---|
| JP | 2020096320 A | 6/2020 |
| JP | 2021019212 A | 2/2021 |
| WO | 2017104096 A1 | 6/2017 |

\* cited by examiner

| NW IDENTIFIER | CAN-ID | IN/OUT |
|---|---|---|
| A | 0x100 | IN |
| A | 0x200 | - |
| B | 0x100 | OUT |
| B | 0x200 | OUT |
| ⋮ | ⋮ | ⋮ |

*FIG.4*

IN-VEHICLE COMMUNICATION APPARATUS, VEHICLE, AND METHOD FOR RELAYING SIGNALS BETWEEN COMMUNICATION NETWORKS

The contents of the following Japanese patent application(s) are incorporated herein by reference:
NO. 2022-058882 filed on Mar. 31, 2022.

BACKGROUND

1. Technical Field

The present invention relates to an in-vehicle communication apparatus, a vehicle, and a method.

2. Related Art

Patent Document 1 discloses that ON/OFF information input from a microcomputer is compared with ON/OFF information discriminated from a voltage level of an ECU output signal to determine the presence or absence of a failure of a drive circuit configured to drive an ECU output signal. List of cited references
Patent Document 1: Japanese Patent Application Publication No. 2020-032806

BRIEF DESCRIPTION OF THE DRAWINGS

FIG. 4 illustrates an example of a data structure of setting information stored by the ECU 100.

DESCRIPTION OF EXEMPLARY EMBODIMENTS

Hereinafter, the present invention will be described by way of embodiments of the invention will be described, but the following embodiments do not limit the invention according to the claims. In addition, not all of the combinations of features described in the embodiments are essential for a solving means of the invention.

Figure 1:
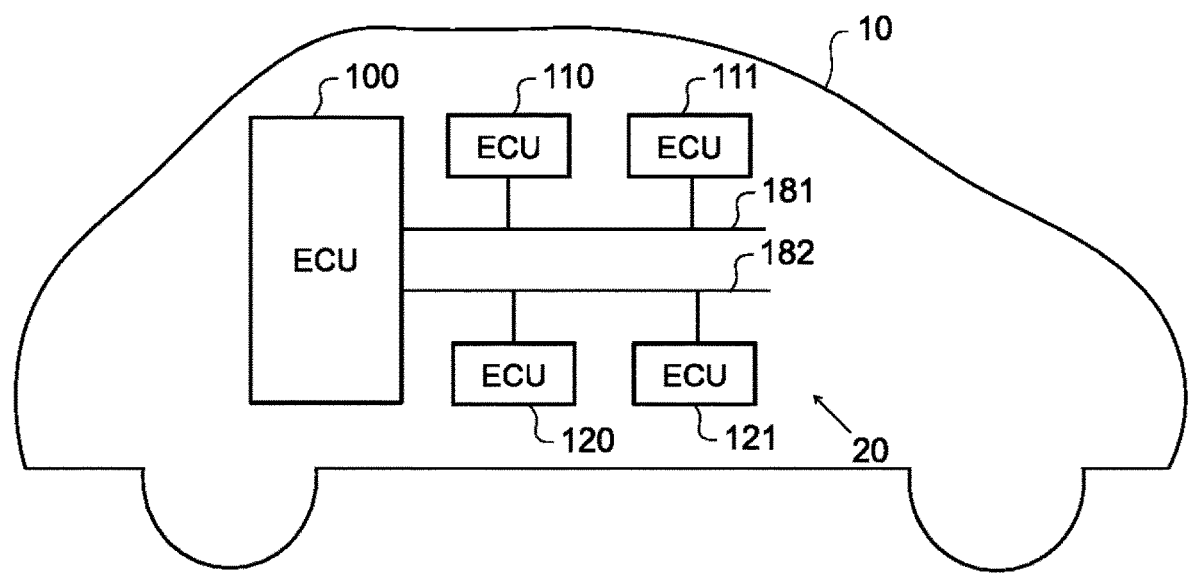
FIG. 1 conceptually illustrates a system configuration of a vehicle 10 in an embodiment.

FIG. 1 conceptually illustrates a system configuration of a vehicle 10 in an embodiment. The vehicle 10 includes a system 20. The system 20 includes a plurality of electronic control units (ECUs) including an ECU 100, an ECU 110, an ECU 111, an ECU 120, and an ECU 121. The ECUs included in the vehicle 10 include an ECU configured to control equipment which directly affects travelling of the vehicle 10, such as, for example, an engine, a gearbox, or a steering gear. The ECUs included in the vehicle 10 include an ECU configured to control equipment which does not directly affect travelling of the vehicle 10, such as, for example, an air conditioner or a navigation apparatus. The ECU 100, the ECU 110, the ECU 111, the ECU 120, and the ECU 121 are examples of an in-vehicle communication apparatus.

The ECUs included in the vehicle 10 are configured to mutually perform communication by controller area network (CAN) communication. The ECU 100, the ECU 110, and the ECU 111 are connected so as to be mutually communicable by a CAN communication network 181. The ECU 100, the ECU 120, and the ECU 121 are connected so as to be mutually communicable by a CAN communication network 182. The ECU 100 is configured to function as a gateway configured to relay communication between the CAN communication network 181 and the CAN communication network 182. The CAN communication network 181 and the CAN communication network 182 are examples of a communication network. The ECU 100, the ECU 110, the ECU 111, the ECU 120, and the ECU 121 may be connected by any communication network.

Figure 2:
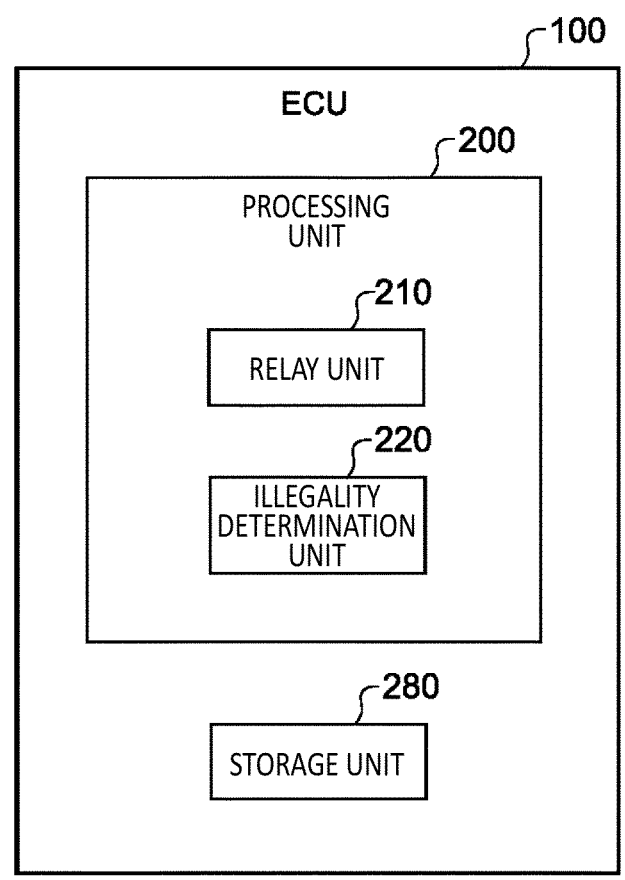
FIG. 2 is a block diagram schematically illustrating a functional configuration included in an ECU 100.

FIG. 2 is a block diagram schematically illustrating a functional configuration included in the ECU 100. The ECU 100 is connected to the CAN communication network 181 and the CAN communication network 182, and relays signals to be transmitted and received between the CAN communication network 181 and the CAN communication network 182. The ECU 100 includes a processing unit 200 and a storage unit 280.

The processing unit 200 may be implemented by a processor such as a central processing unit (CPU) configured to perform computation processing. The storage unit 280 may include a nonvolatile storage medium such as a flash memory or a volatile storage medium such as a random access memory. The ECU 100 may be configured to include a computer. The processing unit 200 operates according to a program stored in the nonvolatile storage medium, and the ECU 100 thereby performs various types of controls.

The processing unit 200 includes a relay unit 210 and an illegality determination unit 220.

The relay unit 210 is configured to relay a signal received by the CAN communication network 181 to the CAN communication network 182. The illegality determination unit 220 is configured to set processing of determining whether the signal to be relayed by the relay unit 210 to the CAN communication network 182 is an illegal signal to be lighter than processing of determining whether the signal received from a first communication network is an illegal signal. For example, the illegality determination unit 220 may omit the processing of determining whether the signal relayed to the CAN communication network 182 is an illegal signal. With regard to the signal relayed from the CAN communication network 181 to the CAN communication network 182, by omitting the determination on whether the signal is an illegal signal, load applied on processing for sensing an illegal signal can be lightened. In addition, the illegality determination unit 220 may determine whether the signal relayed to the CAN communication network 182 is an illegal signal by processing with an operation amount lower than that of the processing of determining whether the signal received from the first communication network is an illegal signal. The illegality determination unit 220 may determine whether the signal relayed to the CAN communication network 182 is an illegal signal by partial processing out of the processing of determining whether the signal received from the first communication network is an illegal signal.

When a signal with same data as the signal received from the CAN communication network 181 is received from the CAN communication network 182, the illegality determination unit 220 may determine that an illegal signal is received. As a result, in response to reception by the CAN communication network 182 of a signal that is not to be received under normal circumstances, it is possible to promptly determine that an illegal signal is received. The storage unit 280 may store a relay history of the signal received by the CAN communication network 181 and relayed to the CAN communication network 182. The illegality determination unit 220 may refer to the relay history stored in the storage unit 280 to determine whether the signal with the same data as the signal received by the CAN communication network 181 is received by the CAN communication network 182.

When a signal of a same type as a signal set to be relayed to the CAN communication network 182 by the relay unit 210 is received by the CAN communication network 182 for a predetermined number of times, the illegality determination unit 220 determines that an illegal signal is received. As a result, by using a number of at least one time for the CAN communication network 182 to receive the above described signal, it is possible to easily determine that an illegal signal is received.

When a signal of a same type as a signal set to be transmitted to the CAN communication network 182 is received by the CAN communication network 182, the illegality determination unit 220 may determine that an illegal signal is received. When a signal with same data as the signal set to be transmitted to the CAN communication network 182 is received by the CAN communication network 182, the illegality determination unit 220 may determine that an illegal signal is received. As a result, in response to the reception by the CAN communication network 182 that is used for the transmission, it is possible to promptly determine that an illegal signal is received. The type of the signal may be identified by a CAN-ID.

When the relay unit 210 relays the signal received by the CAN communication network 181 to the CAN communication network 182, the illegality determination unit 220 may determine whether an illegal signal is received by the CAN communication network 181 and omit the determination on whether the signal relayed to the CAN communication network 182 is an illegal signal.

Figure 3:
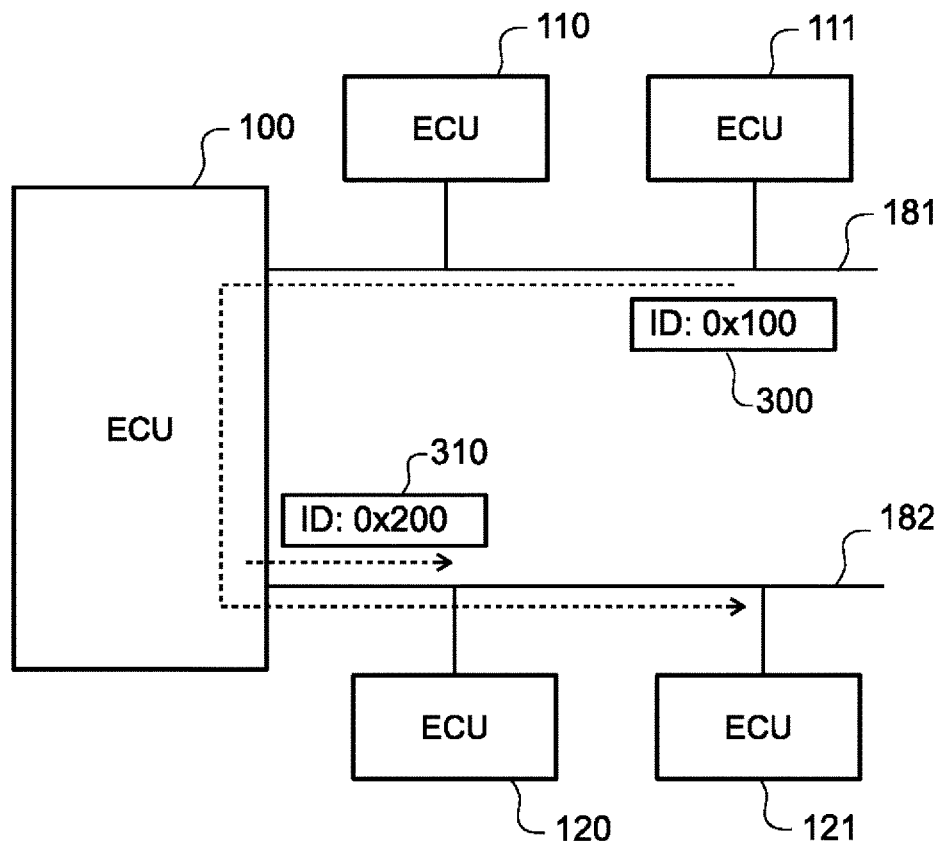
FIG. 3 schematically illustrates an example of a communication setting among ECUs.

FIG. 3 schematically illustrates an example of a communication setting among ECUs. In FIG. 3, routes of a signal 300 to which a CAN-ID: 0x100 has been added and a signal 310 to which a CAN-ID: 0x200 has been added are exemplified.

The signal 300 is a signal to be transmitted by the ECU 111 and used by the ECU 121. When the ECU 111 transmits the signal 300 to the CAN communication network 181, the ECU 100 receives the signal 300 through the CAN communication network 181. When a signal to which the CAN-ID: 0x100 has been added is received by the CAN communication network 181, the ECU 100 is set to relay the signal to the CAN communication network 182. Therefore, the relay unit 210 relays the signal 300 received from the CAN communication network 181 to the CAN communication network 182. The ECU 121 is configured to receive the signal 300 through the CAN communication network 182 and control the vehicle 10 based on the received signal 300.

The signal 310 is a signal to be transmitted by the ECU 100 and used by the ECU 120. When the ECU 100 transmits the signal 310 to the CAN communication network 182, the ECU 120 is configured to receive the signal 310 through the CAN communication network 182 and control the vehicle 10 based on the received signal 310.

When malicious third parties attack the CAN communication network 181 and the CAN communication network 182, there is a case where a signal flowing on the CAN communication network 181 and the CAN communication network 182 is monitored, and a CAN-ID added to the signal flowing on the CAN communication network 181 and the CAN communication network 182 is added to an illegal signal to perform an attack by transmitting the illegal signal to the CAN communication network 181 and the CAN communication network 182. In addition, there is a case where an attack is performed by transmitting a large number of illegal signals created by copying the signal flowing on the CAN communication network 181 and the CAN communication network 182 to the CAN communication network 181 and the CAN communication network 182.

For example, it is assumed that third parties transmit an illegal signal to which the CAN-ID: 0x100 has been added to the CAN communication network 181 and the CAN communication network 182. In this case, the ECU 100 also receives the illegal signal through the CAN communication network 181 in addition to the signal 300. When the signal is received from the CAN communication network 181, the illegality determination unit 220 counts the number of times to receive the signal from the CAN communication network 181 during a predetermined period for each CAN-ID as illegal signal determination processing. As a result, when the number of times to receive the signal to which the CAN-ID: 0x100 has been added exceeds a predetermined threshold, the illegality determination unit 220 determines that an illegal signal is transmitted to the CAN communication network 181. As other illegal signal determination processing, the illegality determination unit 220 may determine whether an illegal signal is received through the CAN communication network 181 by using data contents of a plurality of signals received from the CAN communication network 181, various types of counter information, and the like.

On the other hand, the ECU 100 is set to receive the signal to which the CAN-ID: 0x100 has been added from the CAN communication network 181 and relay the signal to be transmitted to the CAN communication network 182. In addition, the ECU 100 is set to transmit the signal to which the CAN-ID: 0x200 has been added to the CAN communication network 182. Therefore, typically, the signal to which the CAN-ID: 0x100 or the CAN-ID: 0x200 has been added is not to be received by the ECU 100 through the CAN communication network 182. Therefore, when the signal to which the CAN-ID: 0x100 or the CAN-ID: 0x200 has been added is received through the CAN communication network 182, the illegality determination unit 220 can immediately determine that an illegal signal is received. Alternatively, when the signal to which the CAN-ID: 0x100 or the CAN-ID: 0x200 has been added is received through the CAN communication network 182 for a plurality of times, the illegality determination unit 220 can promptly determine that an illegal signal is received. Therefore, when the relay unit 210 relays the signal 300 to be transmitted to the CAN communication network 182, the illegality determination unit 220 omits the illegal signal determination processing for determining whether the signal 300 is an illegal signal.

In this manner, when a signal is received through the CAN communication network 181 or the CAN communication network 182, the illegality determination unit 220 uses different techniques for determining an illegal signal depending on whether a signal with the CAN-ID added to the signal is set to be received from the CAN communication network or whether the above described signal is set to be transmitted to the CAN communication network. In particular, when the signal 300 to which the CAN-ID: 0x100 has been added is relayed by the relay unit 210 to the CAN communication network 182, the processing for determining whether the signal 300 is an illegal signal can be omitted. Furthermore, when the signal to which the CAN-ID: 0x100 or the CAN-ID: 0x200 has been added is received through the CAN communication network 182, without requiring complex processing, it is possible to determine that an illegal signal is received. Therefore, in particular, the load applied to the illegal signal processing on the signal on the CAN communication network 182 can be lightened.

FIG. 4 illustrates an example of a data structure of setting information stored by the ECU 100. The setting information is stored in the storage unit 280. The setting information includes information indicating a communication setting in the system 20.

In the setting information, a network identifier ("NW identifier"), a "CAN-ID", and "IN/OUT information" are stored so as to correspond to one another. The NW identifier is information for identifying the CAN communication network 181 and the CAN communication network 182. In FIG. 4, "A" represents the CAN communication network 181, and "B" represents the CAN communication network 182. The CAN-ID is a CAN-ID added to a signal. The CAN-ID is an example of information for identifying a type of the signal.

IN/OUT is information indicating a type of transmission or reception. Specifically, IN/OUT is information indicating a setting in which a signal to which a corresponding CAN-ID has been added is to be received through a corresponding CAN communication network, or a setting in which a signal to which a corresponding CAN-ID has been added is to be transmitted through a corresponding CAN communication network. "IN" indicates the setting in which the signal to which the corresponding CAN-ID has been added is to be received through the corresponding CAN communication network. "OUT" indicates the setting in which the signal to which the corresponding CAN-ID has been added is to be transmitted through the corresponding CAN communication network.

When a signal is received from the CAN communication network 181 or the CAN communication network 182, the illegality determination unit 220 refers to the setting information to select a transmission or reception type (IN or OUT) corresponding to the CAN-ID added to the received signal and the CAN communication network through which the received signal has been transmitted. The illegality determination unit 220 decides which type of illegality detection processing is to be performed on the received signal based on the selected transmission or reception type.

Figure 5:
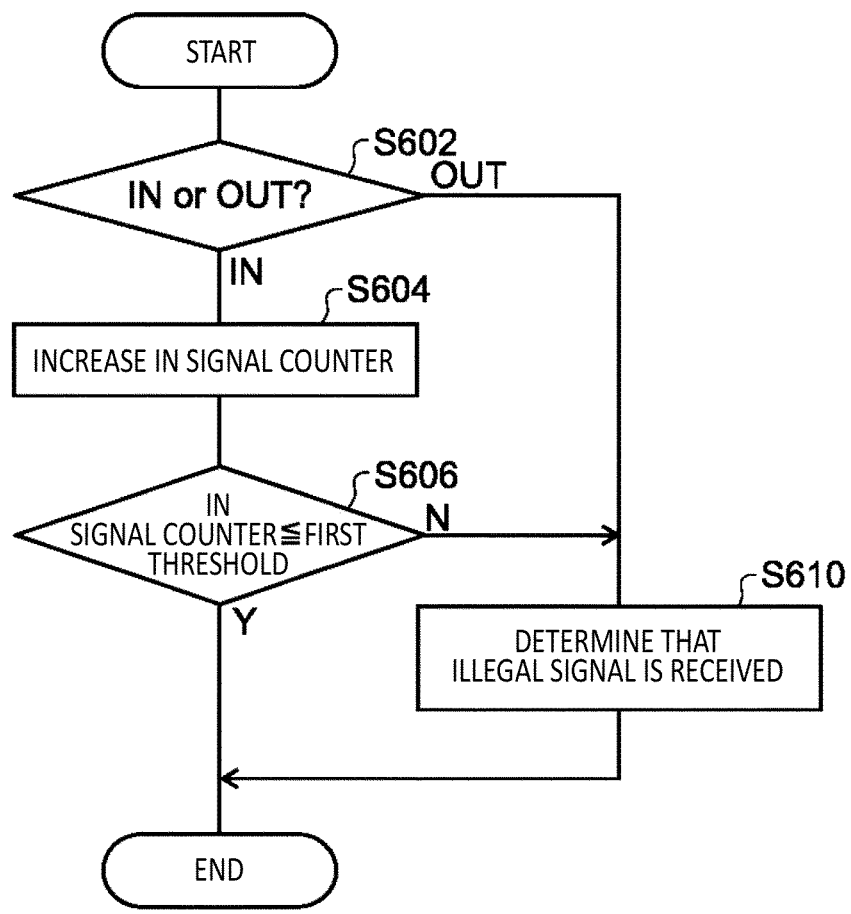
FIG. 5 is a flowchart illustrating processing performed by the ECU 110.

FIG. 5 is a flowchart illustrating processing to be performed by the ECU 110. The processing of the flowchart illustrated in FIG. 5 is performed when a signal is received through either the CAN communication network 181 or the CAN communication network 182.

In S602, the illegality determination unit 220 refers to the setting information to determine the transmission or reception type (IN or OUT) based on the CAN-ID added to a signal and the NW identifier of the CAN communication network through which the signal is received. When the transmission or reception type is IN, in S604, the illegality determination unit 220 increases an IN signal counter. The IN signal counter is a counter configured to count the number of times to receive a signal having the transmission or reception type of IN within a predetermined period.

In S606, the illegality determination unit 220 determines whether the IN signal counter is a predetermined threshold or less. When the IN signal counter is the predetermined threshold or less, the processing of this flowchart is ended. When the IN signal counter exceeds the predetermined threshold, in S610, the illegality determination unit 220 determines that an illegal signal is received, and ends the processing of this flowchart.

When it is determined in S602 that the transmission or reception type is OUT, in 610, the illegality determination unit 220 determines that an illegal signal is received, and ends the processing of this flowchart. Note that when it is determined in S602 that the transmission or reception type is OUT, the illegality determination unit 220 may increase an OUT signal counter that is a counter configured to count the number of times to receive a signal having the transmission or reception type of IN within a predetermined period. Subsequently, the illegality determination unit 220 may determine whether the OUT signal counter is a predetermined second threshold or less. The illegality determination unit 220 may determine that an illegal signal is received when the OUT signal counter exceeds the second threshold, and may determine that an illegal signal is not received when the OUT signal counter is the second threshold or less. The second threshold may be a value less than the first threshold.

As described above, in accordance with the ECU 100 of the present embodiment, when a signal is received through the CAN communication network 181 or the CAN communication network 182, it is possible to use different techniques for determining an illegal signal depending on the transmission or reception type corresponding to the CAN-ID added to the signal. In addition, when a signal is to be relayed between the CAN communication network 181 and the CAN communication network 182, the illegal signal determination processing can be omitted. Thus, the load applied to the illegal signal determination processing on the signal to be transmitted and received through the CAN communication network 181 and the CAN communication network 182 can be lightened. Note that in the present embodiment, the illegal signal determination processing to be performed by the ECU 100 configured to relay a signal has been described. However, at least a part of the illegal signal determination processing to be performed by the ECU 100 can be applied as processing to be performed by an ECU (for example, the ECU 110, the ECU 111, or the like) which is not configured to relay a signal.

Figure 6:
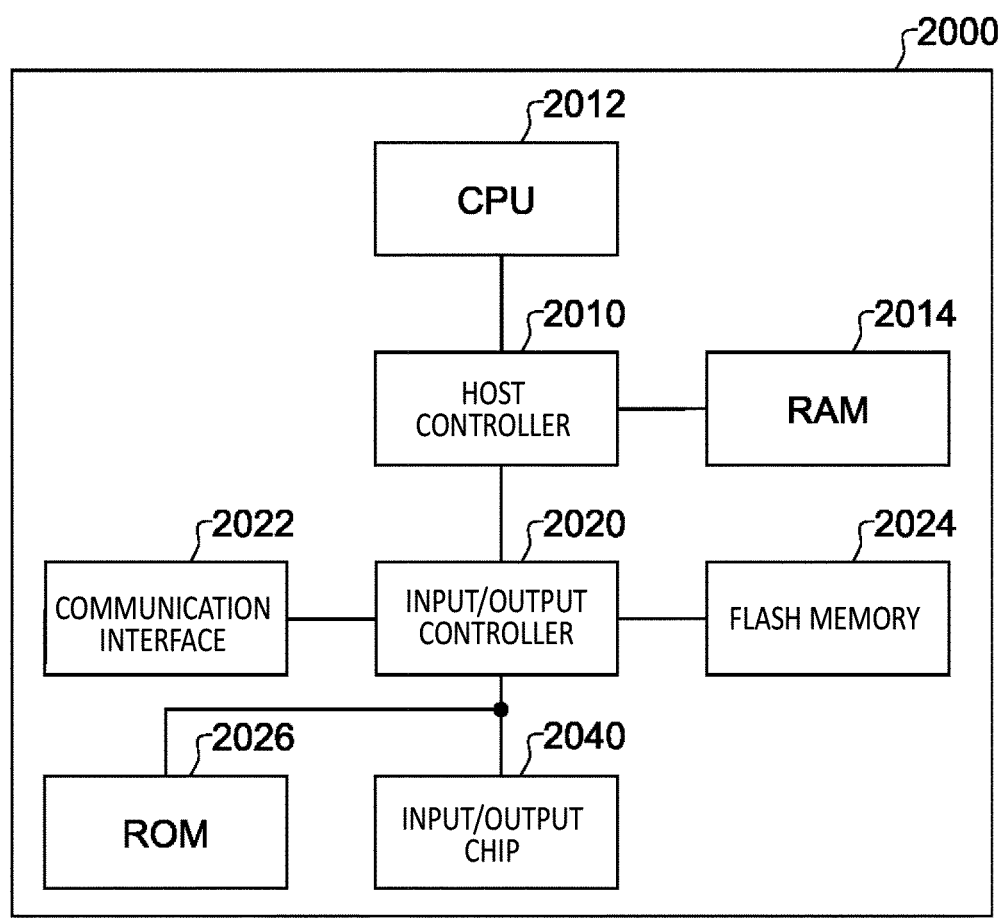
FIG. 6 illustrates an example of a computer 2000.

FIG. 6 illustrates an example of a computer 2000 in which a plurality of embodiments of the present invention may be entirely or partially embodied. Programs installed in the computer 2000 can cause the computer 2000 to: function as a system such as the system 20 according to the embodiments or each unit of the system or an apparatus such as the ECU 100 or each unit of the apparatus; execute operations associated with the system or each unit of the system or the apparatus or each unit of the apparatus; and/or execute a process according to the embodiments or steps of the process. Such a program may be executed by a CPU 2012 to cause the computer 2000 to perform certain operations associated with the processing procedures described herein and some of or all of the blocks in the block diagrams.

The computer 2000 according to the present embodiment includes the CPU 2012 and a RAM 2014, which are mutually connected by a host controller 2010. The computer 2000 also includes a ROM 2026, a flash memory 2024, a communication interface 2022, and an input/output chip 2040. The ROM 2026, the flash memory 2024, the communication interface 2022, and the input/output chip 2040 are connected to the host controller 2010 via an input/output controller 2020.

The CPU 2012 operates according to programs stored in the ROM 2026 and the RAM 2014, thereby controlling each unit.

The communication interface 2022 communicates with other electronic devices via a network. The flash memory 2024 stores programs and data used by the CPU 2012 within the computer 2000. The ROM 2026 stores therein a boot program or the like executed by the computer 2000 at the time of activation, and/or a program depending on the hardware of the computer 2000. The input/output chip 2040 may connect various input/output units such as a keyboard, a mouse, and a monitor to the input/output controller 2020 via input/output ports such as a serial port, a parallel port, a keyboard port, a mouse port, a monitor port, a USB port, and a HDMI (registered trademark) port.

A program is provided via a network or computer readable storage media such as a CD-ROM, a DVD-ROM, or a memory card. The RAM 2014, the ROM 2026, or the flash memory 2024 is an example of the computer readable storage medium. Programs are installed in the flash memory 2024, the RAM 2014, or the ROM 2026 and executed by the CPU 2012. The information processing written in these programs is read by the computer 2000, and thereby cooperation between a program and the above described various types of hardware resources is achieved. An apparatus or method may be constituted by carrying out the operation or processing of information by using the computer 2000.

For example, when communication is executed between the computer 2000 and an external device, the CPU 2012 may execute a communication program loaded onto the RAM 2014 to instruct communication processing to the communication interface 2022, based on the processing written in the communication program. The communication interface 2022, under control of the CPU 2012, reads transmission data stored on transmission buffering regions provided in recording media such as the RAM 2014 and the flash memory 2024, and transmits the read transmission data to a network and writes reception data received from a network to reception buffering regions or the like provided on the recording media.

In addition, the CPU 2012 may cause all or a necessary portion of a file or a database to be read into the RAM 2014, the file or the database having been stored in a recording medium such as the flash memory 2024, etc., and perform various types of processing on the data on the RAM 2014. The CPU 2012 may then write back the processed data to the recording medium.

Various types of information, such as various types of programs, data, tables, and databases, may be stored in the recording medium to undergo information processing. The CPU 2012 may perform various types of processing on the data read from the RAM 2014, which includes various types of operations, information processing, conditional judging, conditional branch, unconditional branch, search/replace of information, etc., as described herein and designated by an instruction sequence of programs, and writes the result back to the RAM 2014. In addition, the CPU 2012 may search for information in a file, a database, etc., in the recording medium. For example, when a plurality of entries, each having an attribute value of a first attribute associated with an attribute value of a second attribute, are stored in the recording medium, the CPU 2012 may search for an entry matching the condition whose attribute value of the first attribute is designated, from among the plurality of entries, and read the attribute value of the second attribute stored in the entry, thereby acquiring the attribute value of the second attribute associated with the first attribute satisfying the predetermined condition.

The programs or software modules described above may be stored in the computer readable storage medium on the computer 2000 or in the vicinity of the computer 2000. A recording medium such as a hard disk or a RAM provided in a server system connected to a dedicated communication network or the Internet can be used as the computer readable storage media. A program stored in the computer readable storage medium may be provided to the computer 2000 via a network.

The programs installed onto the computer 2000 for causing the computer 2000 to function as the ECU 100 may instruct the CPU 2012 or the like to cause the computer 2000 to function as each unit of the ECU 100. The information processing written in these programs are read by the computer 2000 to cause the computer to function as each unit of the ECU 100, which is specific means realized by the cooperation of software and the various types of hardware resources described above. These specific means implement operations or processing of information according to the intended use of the computer 2000 in the present embodiment, and the ECU 100 is thereby constructed to be specific for the intended use.

Various embodiments have been described by referring to the block diagrams and the like. In the block diagram, each block may represent (1) a step of a process in which an operation is executed, or (2) each unit of the apparatus having a role of executing the operation. Certain steps and each unit may be implemented by dedicated circuitry, programmable circuitry supplied with computer readable instructions stored on computer readable storage media, and/or processors supplied with computer readable instructions stored on computer readable storage media. Dedicated circuitry may include digital and/or analog hardware circuits and may include integrated circuits (IC) and/or discrete circuits. Programmable circuitry may include reconfigurable hardware circuits including logical AND, logical OR, logical XOR, logical NAND, logical NOR, and other logical operations, flip-flops, registers, memory elements, etc., such as field-programmable gate arrays (FPGA), programmable logic arrays (PLA), etc.

Computer readable storage media may include any tangible device that can store instructions for execution by a suitable device, such that the computer readable storage medium having instructions stored therein forms at least a portion of an article of manufacture including instructions which can be executed to create means for performing a processing procedure or operations specified in the block diagrams. Examples of the computer readable storage medium may include an electronic storage medium, a magnetic storage medium, an optical storage medium, an electromagnetic storage medium, a semiconductor storage medium, and the like. More specific examples of the computer readable storage medium may include a floppy disk, a diskette, a hard disk, a random access memory (RAM), a read only memory (ROM), an erasable programmable read only memory (EPROM or flash memory), an electrically erasable programmable read only memory (EEPROM), a static random access memory (SRAM), a compact disk read only memory (CD-ROM), a digital versatile disk (DVD), a Blu-ray (registered trademark) disk, a memory stick, an integrated circuit card, or the like.

The computer readable instruction may include an assembler instruction, an instruction-set-architecture (ISA) instruction, a machine instruction, a machine dependent instruction, a microcode, a firmware instruction, state-setting data, or either of source code or object code written in any combination of one or more programming languages including an object-oriented programming language such as Smalltalk (registered trademark), JAVA (registered trademark), and C++, and a conventional procedural programming language such as a "C" programming language or a similar programming language.

Computer readable instructions may be provided to a processor of a general purpose computer, special purpose computer, or other programmable data processing apparatus, or to programmable circuitry, locally or via a local area network (LAN), wide area network (WAN) such as the Internet, etc., to execute the computer readable instructions to provide means for performing described processing procedure or operations specified in the block diagrams. Examples of the processor include a computer processor, a processing unit, a microprocessor, a digital signal processor, a controller, a microcontroller, and the like.

While the present invention has been described above with the embodiments, the technical scope of the present invention is not limited to the above described embodiments. It is apparent to persons skilled in the art that various alterations and improvements can be added to the above described embodiments. It is also apparent from the description of the claims that the embodiments to which such alterations or improvements are made can be included in the technical scope of the present invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, specification, or drawings, it does not necessarily mean that the process must be performed in this order.

EXPLANATION OF REFERENCES

10: vehicle;
20: system;
100: ECU;
110: ECU;
111: ECU;
120: ECU;
121: ECU;
181: CAN communication network;
182: CAN communication network;
200: processing unit;
210: relay unit;
220: illegality determination unit
280: storage unit;
300: signal;
310: signal;
2000: computer;
2010: host controller;
2012: CPU;
2014: RAM;
2020: input/output controller;
2022: communication interface;
2024: flash memory;
2026: ROM;
2040: input/output chip.

What is claimed is:

1. An in-vehicle communication apparatus connected to a first communication network and a second communication network for relaying a signal to be transmitted and received between the first communication network and the second communication network, the in-vehicle communication apparatus comprising:
at least one processor;
a relay unit configured to, using the at least one processor,
receive a first signal from the first communication network;
relay the first signal received from the first communication network to the second communication network as a second signal; and
add an ID to the second signal to indicate that the second signal is to be sent to the second communication network by the relay unit; and
an illegality determination unit configured to, using the at least one processor,
perform a first processing of determining whether the first signal received from the first communication network by the relay unit is an illegal signal; and
set a second processing of determining whether the second signal to be sent by the relay unit to the second communication network is an illegal signal to be lighter than the first processing.

2. The in-vehicle communication apparatus according to claim 1, wherein
the illegality determination unit is further configured to, using the at least one processor, determine that an illegal signal is received when a signal with same data as the first signal received from the first communication network is received from the second communication network.

3. The in-vehicle communication apparatus according to claim 1, wherein
the illegality determination unit is further configured to, using the at least one processor, determine that an illegal signal is received when a signal of a same type as the second signal set to be sent to the second communication network by the relay unit is received by the second communication network for a predetermined number of times.

4. The in-vehicle communication apparatus according to claim 1, wherein
the illegality determination unit is further configured to, using the at least one processor, determine that an illegal signal is received when a signal of a same type as a signal set to be transmitted to the second communication network is received by the second communication network.

5. The in-vehicle communication apparatus according to claim 4, wherein
the illegality determination unit is further configured to determine, using the at least one processor, that an illegal signal is received when a signal with same data as the signal set to be transmitted to the second communication network is received by the second communication network.

6. The in-vehicle communication apparatus according to claim 2, wherein
the illegality determination unit is further configured to, using the at least one processor, determine that an illegal signal is received when a signal of a same type as the second signal set to be sent to the second communication network by the relay unit is received by the second communication network for a predetermined number of times.

7. The in-vehicle communication apparatus according to claim 2, wherein
the illegality determination unit is further configured to, using the at least one processor, determine that an illegal signal is received when a signal of a same type as a signal set to be transmitted to the second communication network is received by the second communication network.

8. The in-vehicle communication apparatus according to claim 3, wherein
the illegality determination unit is further configured to, using the at least one processor, determine that an illegal signal is received when a signal of a same type as a signal set to be transmitted to the second communication network is received by the second communication network.

9. The in-vehicle communication apparatus according to claim 7, wherein
the illegality determination unit is further configured to, using the at least one processor, determine that an illegal signal is received when a signal with same data as the signal set to be transmitted to the second communication network is received by the second communication network.

10. The in-vehicle communication apparatus according to claim 8, wherein
the illegality determination unit is further configured to, using the at least one processor, determine that an illegal signal is received when a signal with same data as the signal set to be transmitted to the second communication network is received by the second communication network.

11. The in-vehicle communication apparatus according to claim 1, wherein
the illegality determination unit is further configured to omit performing the second processing.

12. The in-vehicle communication apparatus according to claim 1, wherein
the illegality determination unit is further configured to, using the at least one processor, perform the second processing having less operation amount compared to the first processing.

13. The in-vehicle communication apparatus according to claim 1, wherein
the illegality determination unit is further configured to, using the at least one processor:
refer setting information of the first signal received from the first communication network, the setting information indicating whether the first signal is to be received from the first communication network or to be sent to the first communication network; and
perform different processing for determining whether the first signal is an illegal signal depending on whether the setting information indicates the first signal is to be received from the first communication network or to be sent to the first communication network.

14. A vehicle comprising the in-vehicle communication apparatus according to claim 1.

15. A method performed in an in-vehicle communication apparatus which is connected to a first communication network and a second communication network and is configured to relay a signal to be transmitted and received between the first communication network and the second communication network, the method comprising:
setting, when a first signal received from the first communication network is to be relayed to the second communication network as a second signal to which an ID to indicate that the second signal is to be sent to the second communication network is added, processing of determining whether the second signal to be relayed to the second communication network is an illegal signal to be lighter than processing of determining whether the first signal received from the first communication network is an illegal signal, and sending the second signal to the second communication network; and
determining that an illegal signal is received when a signal with same data as the first signal received from the first communication network is received from the second communication network.

16. A method performed in an in-vehicle communication apparatus which is connected to a first communication network and a second communication network and is configured to relay a signal to be transmitted and received between the first communication network and the second communication network, the method comprising:
receiving a first signal from the first communication network;
performing a first processing of determining whether the first signal received from the first communication network is an illegal signal;
determining whether the first signal received from the first communication network is to be sent to the second communication network as a second signal;
adding an ID to the second signal to indicate that the second signal is to be sent to the second communication network;
setting, when it is determined that the first signal received from the first communication network is to be sent to the second communication network as the second signal, a second processing of determining whether the second signal to be sent to the second communication network is an illegal signal to be lighter than the first processing, and sending the second signal to the second communication network; and
determining that an illegal signal is received when a signal with same data as the first signal received from the first communication network is received from the second communication network.

* * * * *